Patented June 20, 1944

2,351,866

UNITED STATES PATENT OFFICE 2,351,866

ART OF CELLULOSE ESTER PLASTICS

Isador Miller, New York, N. Y.

No Drawing. Application February 17, 1941,
Serial No. 379,295

10 Claims. (Cl. 106—198)

While the present invention is of high utility in molding compositions for injection molding, it is concerned more broadly with compositions as such and the processes for preparing the same, whether applied in the injection molding or in other arts.

The invention is more particularly concerned with compositions made up of cellulose ester and plasticizer therefor, with or without pigments or other coloring matter.

As conducive to a clear understanding of the invention, it is noted that where cellulose ester and plasticizer therefor dissolved in a low boiling volatile solvent, are to be kneaded to full colloidization, the stock must be kept at temperature sufficiently low to preclude loss of the volatile solvent by evaporation during the kneading or rolling operation. After the stock has been rolled into a sheet, it would be necessary to further process the same as for instance by heating, completely to remove the volatile solvent therefrom. Heating of the fully colloidized mass is apt to be injurious to the product, and the solvents are inflammable, for both of which reasons such heating would have to be conducted slowly and with superlative care over a period of some hours. The removal of the solvent, at best is a difficult operation, because at least traces of the volatile solvent will remain trapped in the tough, horny, colloidal composition under even the most refined of commercially feasible procedures. Such remnants of solvent are deleterious among other reasons, because they volatilize within the hot injection mold and the consequent blisters or bubbles in the molded product, impair its utility and marketability.

Where it is attempted to omit such volatile solvent and to knead the cellulose ester and plasticizer mixture under conditions of temperature and pressure to yield a friable, cellulous, incompletely colloidized composition, which may be ground with facility, reliance would have to be had upon the injection molding operation to complete the colloidization. In that procedure, there is no assurance that such colloidization will occur with complete effectiveness, and the product will frequently lack uniformity and present streaks of color or of discoloration, aside from the fact that the molding operation takes longer, and the output of the available equipment is correspondingly reduced.

It is an object of the invention to provide a cellulose ester composition suitable for injection molding, which is devoid of even traces of low boiling point volatile ingredient or moisture which is thoroughly compacted and colloidized, of tough, horny, non-friable, homogeneous and non-cellulous structure, uniform in color distribution and which admits of being introduced into the injection mold without the need for the preliminary step of preheating, drying or agglomerating.

Another object is to provide a process for expeditiously effecting full and complete colloidization of cellulose ester with plasticizer and despite the tough and horny character of the resulting composition at room temperatures, to effect the ready sheeting, followed by the subdivision of the product into uniform pellets, free from powder, all without the need for intermediate processing, the complete cycle from raw material to the finished molding composition to be performed in well under one-half hour.

According to the invention, the cellulose ester and plasticizer, admixed, if desired, with suitable pigments or other coloring agents such as dyes, are subjected in the absence of any volatile solvent, to a vigorous kneading operation at an elevated temperature, and under high pressure to complete colloidization. The temperature of the stock during kneading is however not much above the softening point thereof, i. e. the temperature at which the stock begins to flow, but is still sufficiently stiff and resistant to admit of kneading the same. The kneading is done at substantially the same temperature range in which the injection molding operation is performed. An incidental advantage of kneading at such high temperature, considerably above the boiling point of water, is the elimination by evaporation of any moisture in either the ester or other raw materials. The plasticizer is of thermally active character, that is, it has little or no solvent or colloiding action upon the cellulose ester in the lower ranges of temperature, but becomes active at the higher kneading temperature set forth, to act to all intents and purposes as a solvent for the ester. Thus, low boiling volatile solvents are dispensed with. The kneaded batch is a homogeneous, intimate combination or amalgamation of the cellulose ester and the plasticizer. While hot, the batch is a dense, pressure resistant, yet plastic gel-like mass which has substantially the same consistency as has the molding composition, at the instant it enters the mold.

Were the mass being kneaded allowed to become heated much beyond the softening point, it would become too fluid to impose the requisite resistance for satisfactory kneading. That difficulty is apt to arise due to the heat of friction generated in the continued kneading operation. It is, therefore, perferred to reduce the applied pressure as kneading proceeds. Desirably the last stage of the kneading is performed to complete the colloidization in the absence of positively applied pressure upon the stock being worked, so that the temperature and, therefore, the stiffness or resistivity of the stock to working will not change materially. Incidentally "breathing" of the stock is permitted in this final kneading step, that is, the escape of the air that had become occluded therein during the pressure kneading operation. Such occluded air if left in the composition, might result in air bubbles within the final molded product.

Were the composition permitted to cool greatly upon completion of the colloidization, its outer surface would become so hard and glossy that it would not readily yield to the nip of a pair of sheeting rolls, even though the interior or core thereof remained hot. According to the present invention, the completely colloided kneaded dense plastic produced in the manner set forth, is not permitted to cool greatly, but it is rolled out into a dense sheet while still hot. After mere surface cooling but with the core thereof still hot, such sheet may be uniformly subdivided, preferably by the method and mechanism described and claimed in the copending application of Joseph F. Jehli, Serial No. 339,899, filed June 11, 1940 now issued as Patent No. 2,335,515 of November 30, 1943. The sub-divided composition thus prepared, if packed warm, remains substantially free from moisture and may be fed into an injection molding press directly without preheating for drying preparatory to use.

The equipment desirably used for carrying out the kneading operation set forth, is not, taken by itself, part of the invention claimed by me. Theoretically any apparatus capable of applying and maintaining the desired heat and pressure thereto while kneading the batch, would serve for the purpose. It is preferred, however, to utilize for the purpose, an internal masticator mixer, such as the well known "Banbury" mixer, in which rotors are so disposed with respect to the wall of a mixing chamber as to wedge the batch therebetween under positive pressure imposed by a ram, for intimate kneading and mixing of the ingredients. The mixing chamber walls are hollow, as are also the rotors, for circulation of suitable heating fluid therethrough to maintain the stock being worked at the desired temperature.

In conformity with the statutory requirements, one specific illustrative embodiment of the process will now be set forth:

Thirty (30) parts by weight of cellulose acetate and plasticizer comprising nine (9) parts of diethylphthalate and four (4) parts of dimethylphthalate are admixed by stirring the plasticizer into the acetate flake in any conventional mixer. The granules of acetate flake are thereby wetted down, so as to reduce losses in the subsequent operation. After the mixing is completed, which ordinarily takes about five minutes, the material is slowly loaded (taking about five minutes) into a "Banbury" mixer of suitable size which has previously been brought to 220 degrees to 230 degrees F., as, for instance, by passing steam at 30 to 40 pounds, both through the mixing chamber walls and the rotor structures. When the loading is completed the ram of the "Banbury" mixer is lowered and the machine is operated under a pressure on the ram of 90 to 120 pounds per square inch. With proper control of the rotor speed, the temperature of the mass being kneaded will in this operation, be raised by internal friction to 300 to 325 degrees F.

After about five minutes of the kneading operation set forth, the ram is raised and the operation is continued for an additional five minutes. In this latter kneading stage, the batch being relieved of positive pressure, does not change materially in temperature under the continued kneading operation, and so remains sufficiently stiff to impose the resistance required for effective kneading and milling and completion of colloidization. The air worked into the kneaded mass during the first or pressure kneading stage, and otherwise maintained therein by occlusion escapes in the final kneading operation, which may be called a breathing period.

The "Banbury" mixer is now opened and the entire kneaded mass will be discharged substantially as a single lump, of weight but slightly less than that of the original ingredients and at substantially the temperature at which the kneading was performed, that is, ordinarily at 300 to 325 degrees F. As a result of the kneading operation set forth, the original powdery and flaky form of the cellulose acetate and the liquid character of the plasticizer have entirely disappeared. The batch produced is fully colloided, smooth, tough, horny, non-cellulous, homogeneous and plastic.

The entire lump taken from the "Banbury" mixer may now be dropped into a feed hopper heated to approximately 250 degrees F., from which the material is delivered, to be rolled into sheets by a pair of sheeting rolls. The continued working in such operation keeps the stock from cooling excessively. During the rolling operation, the sheet is desirably not cooled below 180 degrees F. The sheet will have cooled at its surfaces but is still hot internally by the time it reaches the mechanism that breaks it into pellets, as for instance, according to the teaching of the Jehli application above-identified.

It will be understood that the sheets into which the colloided mass is rolled may be utilized as the ultimate product. Such sheets after proper processing are of utility for instance, as the window panes or other parts of aircraft.

The range of temperature between 300 and 325 degrees above set forth, at which the kneading is desirably performed is not critical, but satisfactory results are obtained if the mass is allowed to cool to as low as in the neighborhood of 275 degrees F. or to become heated to a temperature as high as in the neighborhood of 350 degrees F. The range between 275 and 350 degrees substantially represents the plastic flow range of the composition illustratively set forth.

While the colloided lump in the hopper is desirably kept at about 250 degrees, as set forth, satisfactory results are obtained, if the temperature of the hopper is maintained within the range of between 225 degrees F. and 300 degrees F.

The operation of kneading and sheeting being conducted in a more or less continuous sequence without marked changes in the temperature of the stock, such internal stresses in the finished product are avoided, as would manifest themselves as irregularities or imperfections in the product molded therefrom.

The material being thoroughly colloided, in the preparation thereof according to the operation set forth, and that at substantially the same flow temperature at which the injection molding occurs, the molding operation is especially expeditious, since it is a molding operation and nothing more. The molding step is not depended on to complete the colloidization or the admixture of the ingredients. The material with the required flow at high temperatures and pressures when injected into the cold mold fills the cavities of the latter and immediately sets up to form the finished piece. The complete cycle according to the process takes not more than 20 to 25 minutes from raw materials to finished composition.

The ingredients specified in the illustrative process set forth are typical of many that may be used with substantially equal effectiveness. Instead of cellulose acetate there may be used, for instance, the cellulose propionate or butyrate or other of the lower aliphatic esters of cellulose, either simple or in admixture, or as mixed esters in which the cellulose is esterified by two or more of the esterifying agents.

While it is ordinarily preferred to use as the thermally active plasticizer the mixture of diethylphthalate and dimethylphthalate, it will be understood that any of a wide variety of other plasticizers might be used, including such as triphenylphosphate, esters of glycollic acid and polyglycol esters of other dibasic acids. For any given amount and kind of plasticizer used, the plasticity will have a characteristic relation to temperature and pressure, as is well understood by those skilled in the art.

As many changes could be made in the above process and composition and many apparently widely different embodiments of this invention could be made without departing from the scope of the claims, it is intended that all matter contained in the above description, shall be interpreted as illustrative and not in a limiting sense.

Having thus described my invention, what I claim as new and desire to secure by Letters Patent is:

1. The process of preparing a tough, horny, non-friable, homogeneous and non-cellulous composition suitable for injection molding which consists in kneading under high pressure a mixture of cellulose ester and thermally active plasticizer therefor, free from low boiling volatile ingredients to complete colloidization at a temperature between 275 degrees F. and 350 degrees F., approximating that at which the injection molding operation is performed, said composition being in a plastic gel-like state during the kneading operation.

2. The process of preparing a tough, horny non-friable, homogeneous and non-cellulose composition suitable for injection molding, which consists in kneading to complete colloidization under high pressure and at a temperature between 275 degrees F. and 350 degrees F. a mixture including with a thermally active plasticizer therefor a substance selected from the group consisting of the simple and the mixed acetate, propionate and butyrate esters of cellulose.

3. The process of preparing a tough, horny, non-friable, homogeneous and non-cellulose composition suitable for injection molding, which consists in kneading to complete colloidization under high pressure and at a temperature between 300 degrees F. and 325 degrees F. a mixture including with a thermally active plasticizer therefor, a substance selected from the group consisting of the simple and the mixed acetate, propionate and butyrate esters of cellulose.

4. The process of preparing a composition suitable for injection molding, which consists in kneading cellulose ester and a thermally active plasticizer therefor under high pressure and at substantially the temperature used in injection molding and thereupon continuing the kneading substantially in the absence of applied pressure until the mass is fully colloided and occluded air has escaped therefrom.

5. The process of preparing a composition suitable for injection molding, which consists in kneading cellulose ester and thermally active plasticizer therefor at a temperature between 275 degrees and 350 degrees F. and at a pressure between 90 and 120 pounds per square inch, and thereupon continuing the kneading at substantially said temperature and substantially in the absence of applied pressure until the mass is fully colloided and occluded air has escaped therefrom.

6. The process of preparing a composition suitable for injection molding, which consists in kneading a mixture of cellulose ester and thermally active plasticizer therefor under high applied pressure and at substantially the temperature at which the injection molding is performed and for a period of time in the order of a few minutes, relieving the applied pressure and continuing the kneading operation at substantially the previous kneading temperature for a short period in the order of a few minutes, thereby to complete the colloidization and to remove occluded air from the mass.

7. The process of preparing a composition suitable for injection molding, which consists of kneading a mixture of lower cellulose ester and plasticizer therefor at a temperature in the order of 300 degrees F. and a pressure in the order of 100 pounds per square inch for a period in the order of five minutes and greatly reducing the pressure and continuing the kneading at substantially said temperature for a period in the order of an additional five minutes to effect complete colloidization of the mass and escape of substantially all occluded air therefrom.

8. The process of preparing a composition suitable for injection molding, which consists in kneading a mixture of cellulose ester and thermally active plasticizer therefor under substantial pressure and at substantially the temperature at which the injection molding is performed and continuing the kneading in the absence of applied pressure until the mass is fully colloided and occluded air has escaped therefrom and maintaining the material at substantially the temperature of kneading while commencing the sheeting thereof and maintaining said material warm during the sheeting operation.

9. The process of preparing composition suitable for injection molding, which consists in kneading a mixture of cellulose ester and thermally active plasticizer therefor, at substantially the temperature at which injection molding is performed and under substantial pressure, continuing the kneading in the absence of applied pressure until the mass is fully colloided and occluded air has escaped therefrom and then maintaining the material at substantially the temperature of kneading while commencing the sheeting thereof completing the sheeting, and while the core of the sheet is still warm subdividing it by impact into small pellets.

10. The process of preparing composition suitable for injection molding, which consists in kneading a mixture of cellulose ester and thermally active plasticizer therefor, at a temperature between 275 degrees F. and 350 degrees F. and under a pressure between 90 pounds and 120 pounds per square inch, continuing the kneading in the absence of applied pressure while maintaining the batch at substantially said temperature until the batch is fully colloided and occluded air has escaped therefrom, subjecting the batch to a temperature of 225 degrees F. to 300 degrees F. preparatory to sheeting the material at a gradually lowering temperature, the minimum of which is 180 degrees F. and while the core of the sheet is still warm subdividing it by impact into small pellets.

ISADOR MILLER.